US010003548B2

(12) United States Patent
Lee et al.

(10) Patent No.: US 10,003,548 B2
(45) Date of Patent: Jun. 19, 2018

(54) DATA TRANSMISSION METHOD USING MULTIPLE WIRELESS NETWORKS

(71) Applicant: QISDA CORPORATION, Taoyuan (TW)

(72) Inventors: Wei-Huan Lee, New Taipei (TW); Chia-Hao Hsu, Taipei (TW); Hsin-Che Hsieh, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 303 days.

(21) Appl. No.: 14/931,830

(22) Filed: Nov. 3, 2015

(65) Prior Publication Data

US 2016/0173408 A1  Jun. 16, 2016

(30) Foreign Application Priority Data

Dec. 12, 2014 (TW) .............................. 103143559 A (51) Int. Cl.
*H04L 12/915* (2013.01)
*H04L 12/927* (2013.01)

(52) U.S. Cl.
CPC .......... *H04L 47/787* (2013.01); *H04L 47/803* (2013.01)

(58) Field of Classification Search
CPC ...................... H04L 47/787; H04L 47/803
See application file for complete search history.

(56) References Cited

U.S. PATENT DOCUMENTS

| 7,151,938 | B2 * | 12/2006 | Weigand | ................ | H04L 41/06 |
| | | | | | 370/231 |
| 8,909,220 | B1 * | 12/2014 | Aftahi | .................. | H04B 7/2041 |
| | | | | | 370/316 |
| 2008/0259852 | A1 * | 10/2008 | Massiera | ................ | H04L 47/10 |
| | | | | | 370/329 |
| 2009/0070454 | A1 * | 3/2009 | McKinnon, III | ... | H04L 12/2801 |
| | | | | | 709/224 |
| 2009/0180430 | A1 | 7/2009 | Fadell | | |
| 2009/0232088 | A1 | 9/2009 | Wisely | | |
| 2010/0074109 | A1 | 3/2010 | Klingenbrunn | | |

(Continued)

FOREIGN PATENT DOCUMENTS

| CN | 101247645 A | 8/2008 |
| CN | 101662810 A | 3/2010 |
| CN | 101686531 A | 3/2010 |

(Continued)

*Primary Examiner* — Min Jung (57) ABSTRACT

Data transmission method includes a first mobile device linking a first wireless network with a first linking quality and a second wireless network with a second linking quality. The first mobile device acquires a sum of first bandwidth requirements and a sum of second bandwidth requirements of application programs currently running. The first mobile device acquires a bandwidth allocation result according to the first linking quality, the second linking quality, the sum of first bandwidth requirements, and the sum of second bandwidth requirements. The first mobile device performs data link to the first wireless network and/or the second wireless network according to the bandwidth allocation result, and then performs data transmission of the application programs. The sum of second bandwidth requirements is greater than the sum of first bandwidth requirements. The bandwidth allocation result corresponds to a bandwidth usage value for all application programs.

18 Claims, 3 Drawing Sheets

(56) References Cited

U.S. PATENT DOCUMENTS

2014/0269388 A1    9/2014   Kuru
2014/0282747 A1*   9/2014   Richman ............ H04W 76/026
                                                                725/62

FOREIGN PATENT DOCUMENTS

| CN | 101951663 A | 1/2011 |
| CN | 102469535 A | 5/2012 |
| CN | 102946641 A | 2/2013 |
| CN | 103347273 A | 10/2013 |
| TW | 201218818 A1 | 5/2012 |

* cited by examiner

DATA TRANSMISSION METHOD USING MULTIPLE WIRELESS NETWORKS

CROSS REFERENCE TO RELATED APPLICATION

This non-provisional application claims priority of Taiwan application 103143559, filed on Dec. 12, 2014, and included herein by reference.

BACKGROUND OF THE INVENTION

1. Field of the Invention

The present invention relates to a data transmission method, and more particularly, a wireless data transmission method for mobile devices.

2. Description of the Prior Art

As the popularity of mobile devices increases and the demand for higher quality increases, focus is being placed on the development of next generation mobile network technology. The evolution of wireless communication includes the earlier first generation analog communications technology (1G), the second generation Global System for Mobile (GSM) communications technology (2G), the third generation Wideband Code Division Multiple Access (WCDMA) communications technology (3G), up to the latest fourth generation Long-Term Evolution (LTE) communications technology (4G). Each generation of the communications technologies is established using different algorithms. Aside from transmission rate, against channel fading, spectrum density, and power consumption, the signal penetration distance is also considered. The transmission signal of the third generation and fourth generation communications technology uses orthogonal frequency division multiplexing modulation to increase the transmission strength and the penetration distance.

However, as the popularity of smart phones and wireless mobile devices grow, intercommunication of multimedia files and application programs may be implemented by using wireless network. The abovementioned multimedia files and application programs can be files having a size as big as gigabytes (GB). Therefore, even though fourth generation communications technology is used for transmission, insufficient transmission rate could still be an open question. At present, researches are being done to develop a fifth generation communications technology and the fifth generation communications technology is predicted to be available by year 2020. The fifth generation communications technology is predicted to transmit 1 GB data per minute by using radio frequency of 28 GHz with maximum distance of 2 kilometers. Although the fifth generation communications technology is expected in the future to increase the transmission speed, it is important to develop a transmission method for increasing the transmission rate without dramatically modifying the hardware of the mobile devices.

For the presently available smart phones and wireless mobile devices, most of the devices are able to link to the internet by using at least one communication interface. The at least one communication interface can be the interface of wireless wide area network (WWAN) of 2G, 3G and 4G, wireless local area network (WLAN), or Bluetooth. However, a mobile device can only use one communication interface with respect to a specific communication technique. In other words, utilization of two or more communication interfaces (or say, two or more communication techniques) at the same instant is not available.

Therefore, it is important to develop a method for increasing the transmission rate in conjunction with optimizing the bandwidth allocation of the mobile devices by using several heterogeneous networks without greatly modifying hardware of the mobile devices.

SUMMARY OF THE INVENTION

An embodiment of the present invention discloses a data transmission method. The data transmission method comprises linking a first mobile device to a first wireless network with a first linking quality and a second wireless network with a second linking quality, acquiring a sum of first bandwidth requirements of application programs currently running in the first mobile device, acquiring a sum of second bandwidth requirements of application programs currently running in the first mobile device, acquiring a bandwidth allocation result according to the first linking quality, the second linking quality, the sum of first bandwidth requirements, and the sum of second bandwidth requirements by the first mobile device, establishing a data link to the first wireless network and/or the second wireless network from the first mobile device according to the bandwidth allocation result, and performing data transmission between the application programs and the first wireless network and/or the second wireless network. The sum of second bandwidth requirements is greater than the sum of first bandwidth requirements. The bandwidth allocation result corresponds to a value of bandwidth utilization. And, the value of bandwidth utilization is between the sum of first bandwidth requirements and the sum of second bandwidth requirements.

Another embodiment of the present invention discloses a data transmission method. The data transmission method comprises linking a plurality of mobile devices to a first wireless network, acquiring a sum of minimum bandwidth requirements of application programs currently running in each mobile device, acquiring a sum of maximum bandwidth requirements of application programs currently running in each mobile device, linking an external mobile device to the first wireless network, acquiring a sum of external minimum bandwidth requirements of application programs currently running in the external mobile device, acquiring a sum of external maximum bandwidth requirements of application programs currently running in the external mobile device, and adjusting a utilization bandwidth of the external mobile device according to a sum of minimum bandwidth requirements of the plurality of mobile devices, a sum of maximum bandwidth requirements of the plurality of mobile devices, the sum of external minimum bandwidth requirements of the external mobile device, and/or the sum of external maximum bandwidth requirements of the external mobile device.

A further embodiment of the present invention discloses a data transmission method. The data transmission method comprises linking a plurality of mobile devices to a first wireless network, each mobile device of the plurality of mobile devices having a bandwidth utilized by at least one application program, and acquiring a sum of bandwidths of the plurality of mobile devices. When the sum of bandwidths of the plurality of mobile devices is greater than a predetermined value, a bandwidth of at least one mobile device selected from the plurality of mobile devices is decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
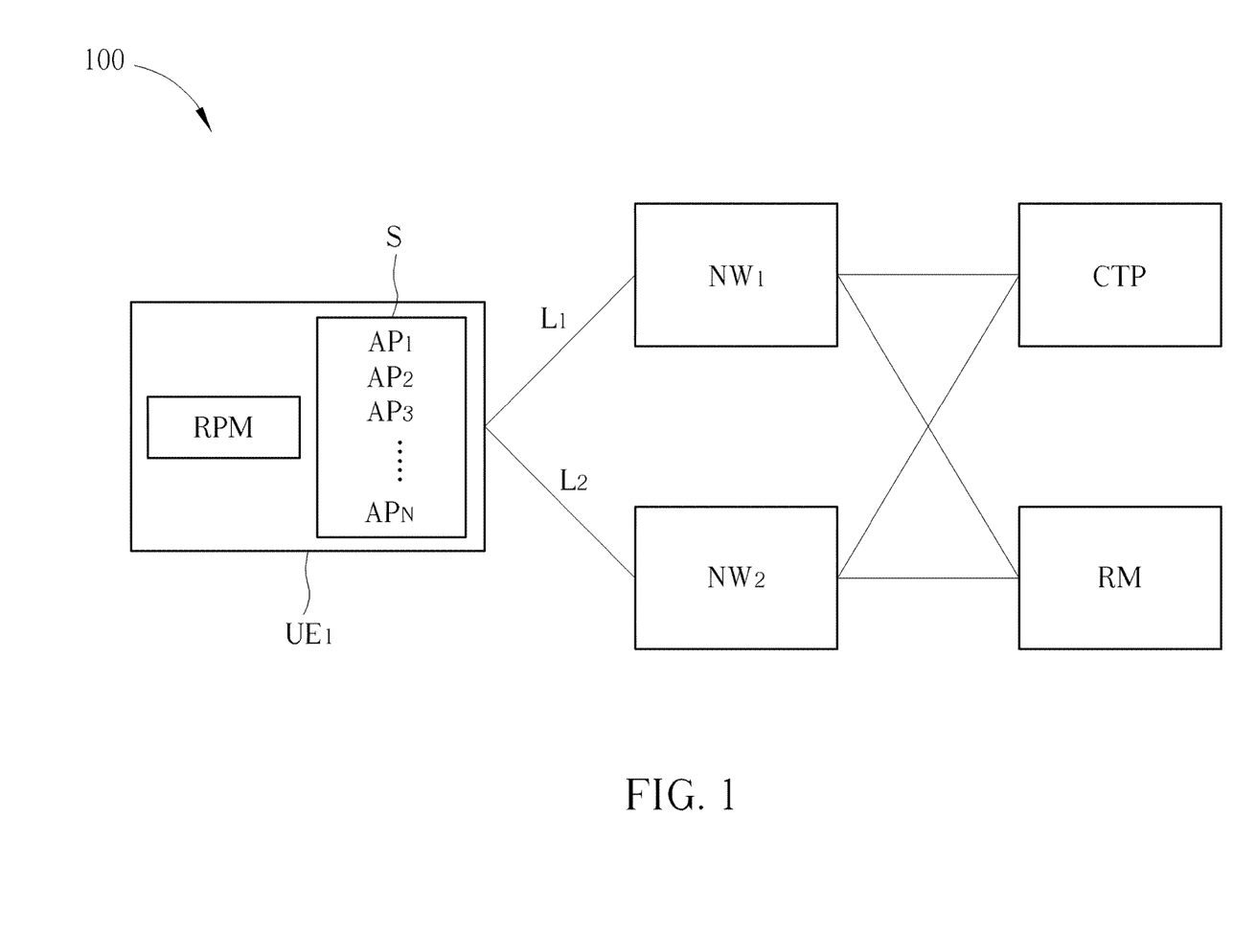
FIG. 1 illustrates a block diagram of a data transmission system according to an embodiment of the present invention.

FIG. 1 illustrates a block diagram of a data transmission system 100 according to an embodiment of the present invention. The data transmission system 100 comprises a mobile device $UE_1$, a first network $NTAT_1$, a second network $NW_2$, a content provider CTP, and a resource management device RM. The mobile device $UE_1$ may establish a wireless link to a base station of the first network $NW_1$ through a first path $L_1$. The mobile device $UE_1$ may establish a wireless link to a base station of the second network $NW_2$ through a second path L2. The mobile device $UE_1$ may have an internal routing policy manager RPM and a list S listing application programs $AP_1$ to $AP_N$ currently running. The resource management device RM and the content provider CTP are linked to the first network $NW_1$ and the second network $NW_2$. Each of the first network $NW_1$ and the second network $NW_2$ is a heterogeneous network. However, the embodiment presented having the first network $NW_1$ and the second network $NW_2$ is only an exemplary embodiment and is not meant to limit the scope of the invention. The resource management device RM and the content provider CTP may link to more than two heterogeneous networks instead. Furthermore, the resource management device RM and/or the content provider CTP are not limited to being linked to the first network $NW_1$ and the second network $NW_2$ from outside the mobile device $UE_1$. The resource management device RM and/or the content provider CTP may be built-in devices of the mobile device $UE_1$. The application programs $AP_1$, $AP_2$, to $AP_N$ currently running in the mobile device $UE_1$ may each have a different bandwidth requirement. The mobile device $UE_1$ may first separately acquire the linking quality of the link to the first network $NW_1$ through the first path $L_1$ and the linking quality of the link to the second network $NW_2$ through the second path $L_2$. After determining the bandwidth requirement of each of the application programs $AP_1$ to $AP_N$ currently running, a bandwidth allocation result may be generated. Afterwards, the mobile device $UE_1$ may establish a data link to the first network $NW_1$ and/or the second network $NW_2$ according to the bandwidth allocation result and perform data transmission of each of the application programs $AP_1$ to $AP_N$ currently running. Therefore, the bandwidth used by each of the application programs $AP_1$, $AP_2$, to $AP_N$ currently running may be the optimal allocation of bandwidth provided by the two heterogeneous networks ($NW_1$ and $NW_2$) and, in doing so, improve transmission speed. The following paragraphs will further describe the bandwidth allocation method.

Figure 2:
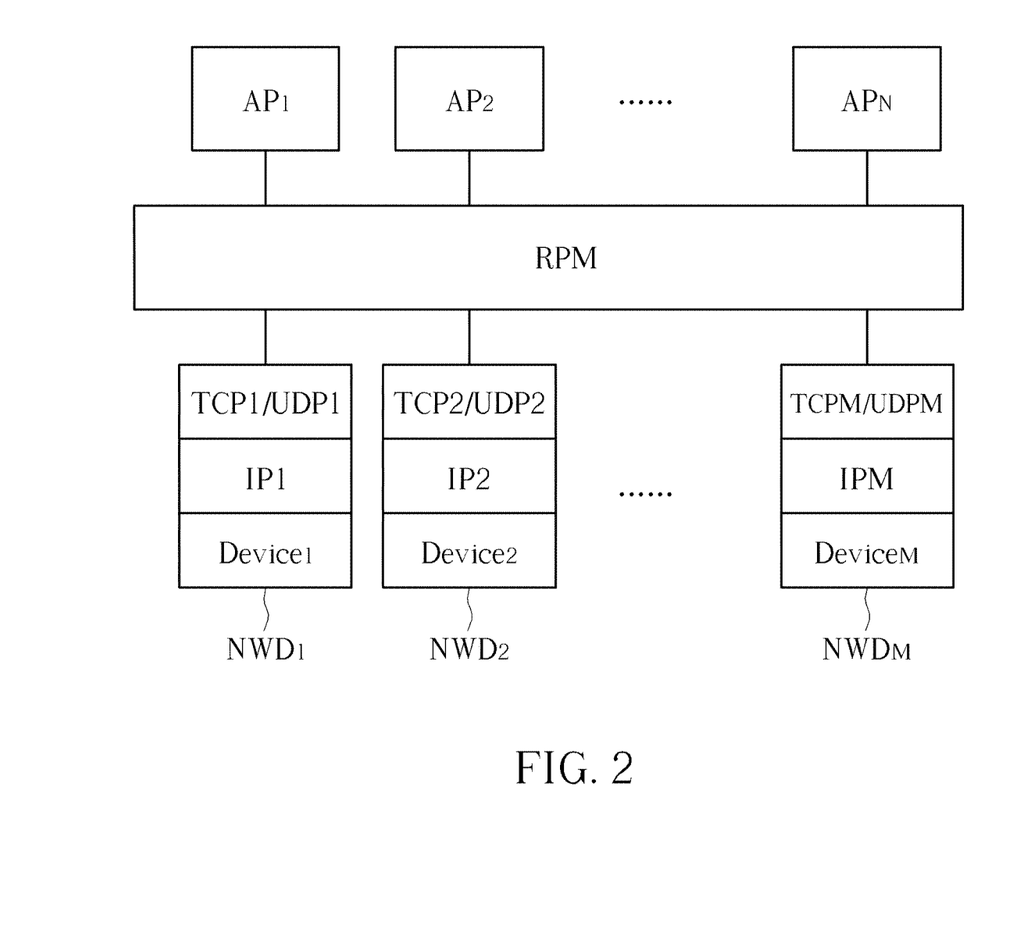
FIG. 2 illustrates a block diagram of a bandwidth allocation method of the data transmission system in FIG. 1.

FIG. 2 illustrates a block diagram of a bandwidth allocation method of the data transmission system in FIG. 1. As shown in FIG. 2, the mobile device $UE_1$ may consider the bandwidth requirement of each of the N application programs $AP_1$ to $AP_N$ currently running. In the embodiment, the bandwidth requirement of each of N application programs $AP_1$ to $AP_N$ currently running may be divided into two categories. The first category may contain minimum bandwidth requirements of the application programs $AP_1$ to $AP_N$. The second category may contain maximum bandwidth requirements of the application programs $AP_1$ to $AP_N$, also known as the optimal bandwidths. As shown in FIG. 2, the minimum bandwidth requirements of application programs $AP_1$ to $AP_N$ may respectively be $C_1$ to $C_N$. The maximum bandwidth requirements of application programs $AP_1$ to $AP_N$ may respectively be $V_1$ to $V_N$. Each of the minimum bandwidth requirements $C_1$ to $C_N$ may be the bandwidth required by a corresponding application program during updating, positioning, and/or periodically reporting or the minimum bandwidth required when the application program is a foreground application program. Each of the maximum bandwidth requirements $V_1$ to $V_N$ may be the bandwidth used for data transmission at a maximum speed or the bandwidth required by a high resolution multimedia application program. The routing policy manager RPM of the mobile device $UE_1$ may be used to obtain a sum C of the minimum bandwidth requirements and a sum V of the maximum bandwidth requirements of the application programs $AP_1$ to $AP_N$. The sum C is the summation of the minimum bandwidth requirements $C_1$, $C_2$, to $C_N$, as $$C = \sum_{n=1}^{N} C_n.$$

The sum V is the summation of the maximum bandwidth requirements $V_1$ to $V_N$, as $$V = \sum_{n=1}^{N} V_n.$$

The routing policy manager RPM may acquire the linking qualities of the links of the network interfaces $NWD_1$ to $NWD_M$ of the mobile device $UE_1$ to the corresponding networks. As compared to FIG. 1, if the states of the first network $NW_1$ and the second network $NW_2$ are being considered, the routing policy manager RPM may determine the linking quality $LQ_1$ of the link of the mobile device $UE_1$ to the first network $NW_1$ through the first path $L_1$ and the linking quality $LQ_2$ of the link of the mobile device $UE_1$ to the second network $NW_2$ through the second path $L_2$. The present invention may consider the states of M heterogeneous networks. As shown in FIG. 2, when considering M heterogeneous networks, the routing policy manager RPM may acquire M linking qualities $LQ_1$ to $LQ_M$, wherein N and M are positive integers. The first network $NW_1$ and the second network $NW_2$ may be used as example for the description. According to the embodiment, the linking quality $LQ_1$ of the first network $NW_1$ and the linking quality $LQ_2$ of the second network $NW_2$ may be defined using any measurement related to a network, for example, transmission rate, transmission delay, packet error rate, power consumption and/or cost. The routing policy manager RPM may use an objective function to generate the bandwidth allocation result according to the abovementioned measurements related to the networks. For example, when the user wants to optimize all the application programs $AP_1$ to $AP_N$ currently running according to transmission delays, the routing policy manager RPM may consider the transmission delays (measured by the content provider CTP) when acquiring the linking quality $LQ_1$ of the first network $NW_1$ and the linking quality $LQ_2$ of the second network $NW_2$. When the user wants to optimize all the application programs $AP_1$ to $AP_N$ currently running according to transmission speeds, the routing policy manager RPM may consider the transmission speeds when acquiring the linking quality $LQ_1$ of the first network $NW_1$ and the linking quality $LQ_2$ of the second network $NW_2$. The description below discloses how the mobile device $UE_1$ allocates the bandwidths used by the application programs $AP_1$ to $AP_N$ currently running to the first network $NW_1$ and the second network $NW_2$.

An example is used to describe the method of allocation of bandwidths used by the application programs $AP_1$ to $AP_N$ currently running to the first network $NW_1$ and the second network $NW_2$ by the mobile device $UE_1$. The status of the mobile device $UE_1$ may be set first. The application programs $AP_1$ to $AP_N$ currently running on the mobile device $UE_1$ may have the application program $AP_1$ be a foreground program and the application programs $AP_2$ to $AP_N$ be background programs. Therefore, the routing policy manager RPM may obtain the sum C of the minimum bandwidth requirements. The sum C is defined as the summation of the foreground minimum bandwidth requirement $C_1$ of the foreground application program $AP_1$ and the background minimum bandwidth requirements $C_2$ to $C_N$ of the background application programs $$AP_2 \text{ to } AP_N \left( C = \sum_{n=1}^{N} C_n \right).$$

The routing policy manager RPM may obtain the sum V of the maximum bandwidth requirements. The sum V is defined as the summation of the foreground maximum bandwidth requirement $V_1$ of the foreground application programs $AP_1$ and the background maximum bandwidth requirements $V_2$ to $V_N$ of the background application programs $$AP_2 \text{ to } AP_N \left( V = \sum_{n=1}^{N} V_n \right).$$

The foreground application program $AP_1$ may be the application program currently being used by the user on the screen and may have a higher priority. The background application programs $AP_2$ to $AP_N$ may be application programs hidden in the background of the operating system of the mobile device $UE_1$ or resident programs. According to the embodiment, the sum V of the maximum bandwidth requirements is greater than the sum C of the minimum bandwidth requirements. For the foreground application program $AP_1$ the foreground maximum bandwidth requirement $V_1$ is greater than the foreground minimum bandwidth requirement $C_1$. For example, when the foreground application program $AP_1$ uses the foreground maximum bandwidth requirement $V_1$ for linking, the user may be using high resolution multimedia in the data transmission. In the contrary, when the foreground application program $AP_1$ uses the foreground minimum bandwidth requirement $C_1$ for linking, the user may be using low resolution multimedia in the data transmission. The routing policy manager RPM may determine the linking quality $LQ_1$ of the first network $NW_1$ and the linking quality $LQ_2$ of the second network $NW_2$. The routing policy manager RPM may generate the bandwidth allocation result according to the linking quality $LQ_1$ of the first network $NW_1$, the linking quality $LQ_2$ of the second network $NW_2$, the sum V of the maximum bandwidth requirements, and the sum C of the minimum bandwidth requirements. The bandwidth allocation result may be used for establishing a data link to the first network $NW_1$ and/or the second network $NW_2$ and perform data transmission for application programs $AP_1$ to $AP_N$. For example, if the linking quality $LQ_1$ of the first network $NW_1$ is better than the linking quality $LQ_2$ of the second network $NW_2$, the routing policy manager RPM may allocate the bandwidth of the first network $NW_1$ to the foreground application program $AP_1$ and the background application programs $AP_2$ to $AP_N$ may selectively use the bandwidths of the first network $NW_1$ and the second network $NW_2$. And, when the total bandwidth $NWB_1$ provided by the first network $NW_1$ and the total bandwidth $NWB_2$ provided by the second network $NW_2$ are both greater than or equal to the sum V of the maximum bandwidth requirements, the bandwidth of the foreground application program $AP_1$ may be allocated to the first network $NW_1$ having a better linking quality (high transmission speed, low transmission delay, low packet error rate, etc.) to ensure that the foreground application program $AP_1$ may smoothly connect to the internet when being used by the user. The background application programs $AP_2$ to $AP_N$ may selectively use the bandwidths of the first network $NW_1$ (if the first network has free bandwidth) and the second network $NW_2$ to ensure that the linking qualities for the background application programs $AP_2$ to $AP_N$ are maintained at a certain level. However, the present invention is not limited to the abovementioned embodiment. When the linking quality $LQ_1$ of the first network $NW_1$ is much better than the linking quality $LQ_2$ of the second network $NW_2$, the routing policy manager RPM may allocate the bandwidth of the first network $NW_1$ to the foreground application program $AP_1$ and the background application programs $AP_2$ to $AP_N$. According to the bandwidth properties (according to the minimum bandwidth requirements and the maximum bandwidth requirements) of the application programs $AP_1$ to $AP_N$, the bandwidth requirements are dynamically allocated to several different heterogeneous networks (i.e. the first network $NW_1$ and the second network $NW_2$). The method of using bandwidths of several heterogeneous networks simultaneously may not only increase the channel capacity but also increase the data transmission rate.

According to the embodiment, the bandwidth requirements of the foreground application program $AP_1$ and the background application programs $AP_2$ to $AP_N$ may be determined in real time or may be determined periodically. When the user selectively terminates a currently running application program $AP_1$ and executes a new application program $AP_1'$ in the mobile device $UE_1$, the routing policy manager RPM may determine bandwidth requirements of a new foreground application program $AP_1'$ and new background application programs $AP_2'$ to $AP_N'$. Therefore, the sum C of the minimum bandwidth requirements and the sum V of the maximum bandwidth requirements may be updated. In the same way as the method of allocation of bandwidths described above, the routing policy manager RPM may generate a new bandwidth allocation result according to the linking quality $LQ_1$ of the first network $NW_1$, the linking quality $LQ_2$ of the second network $NW_2$, the updated sum V' of the maximum bandwidth requirements, and the updated sum C' of the minimum bandwidth requirements. The new bandwidth allocation result may be used for establishing a data link to the first network $NW_1$ and/or the second network $NW_2$ and perform data transmission for application programs $AP_1'$ to $AP_N'$. Therefore, when bandwidths of the application programs currently running in the mobile device $UE_1$ change, the routing policy manager RPM may measure the bandwidth variations in real-time and reallocate the bandwidths for the first network $NW_1$ and the second network $NW_2$. Furthermore, according to FIG. 1, the mobile device $UE_1$ may use the resource management device RM linked to the first network $NW_1$ and the second network $NW_2$ to perform bandwidth allocation. The bandwidth allocation to be performed may be the same as the bandwidth allocation disclosed above. The difference may be in that the mobile device $UE_1$ may report the bandwidths used (including the sum C of the minimum bandwidth requirements and the sum V of the maximum bandwidth requirements) by the application programs currently running to the resource management device RM. The resource management device RM may then perform bandwidth allocation for all the application programs currently running in the mobile device $UE_1$ according to the sum V of the maximum bandwidth requirements, the sum C of the minimum bandwidth requirements, the linking quality $LQ_1$ of the first network $NW_1$, and the linking quality $LQ_2$ of the second network $NW_2$. By using a plurality of heterogeneous networks, the present invention may be used to increase the data transmission rate of media/video data stream. For example, the foreground application program $AP_1$ may be a media/video data stream program, such as YouTube™. The mobile device $UE_1$ may divide the video data to several time intervals of discrete video data. For example, the first time interval may be 0 to 1 minute of video data, the second time interval may be 1 to 2 minutes of video data and so on. The mobile device $UE_1$ may allocate a bandwidth for the foreground application program $AP_1$ and, at the same time, transmit the video data of the first time interval using the first network $NW_1$ and transmit the video data of the second time interval using the second network $NW_2$. In this embodiment, the data bandwidth may be divided to the first network $NW_1$ and the second network $NW_2$. The bandwidths of the two networks may simultaneously be used to access and transmit data. Therefore, the problem of not being able to transmit video data due to bandwidth limitation of a single network such as the first network $NW_1$ and the second network $NW_2$ can be resolved. Furthermore, if the linking qualities of the first network $NW_1$ and the second network $NW_2$ are similar, the data transmission time of the application program $AP_1$ may be reduced to approximately half of the original. Because time division multiplexing through two heterogeneous networks can be used for the data transmission, there is an increase of timing utilization rate for each of the networks as compared to a data transmission system with only one network. Thus, the present invention can mitigate traffic congestion during data transmission.

Figure 3:
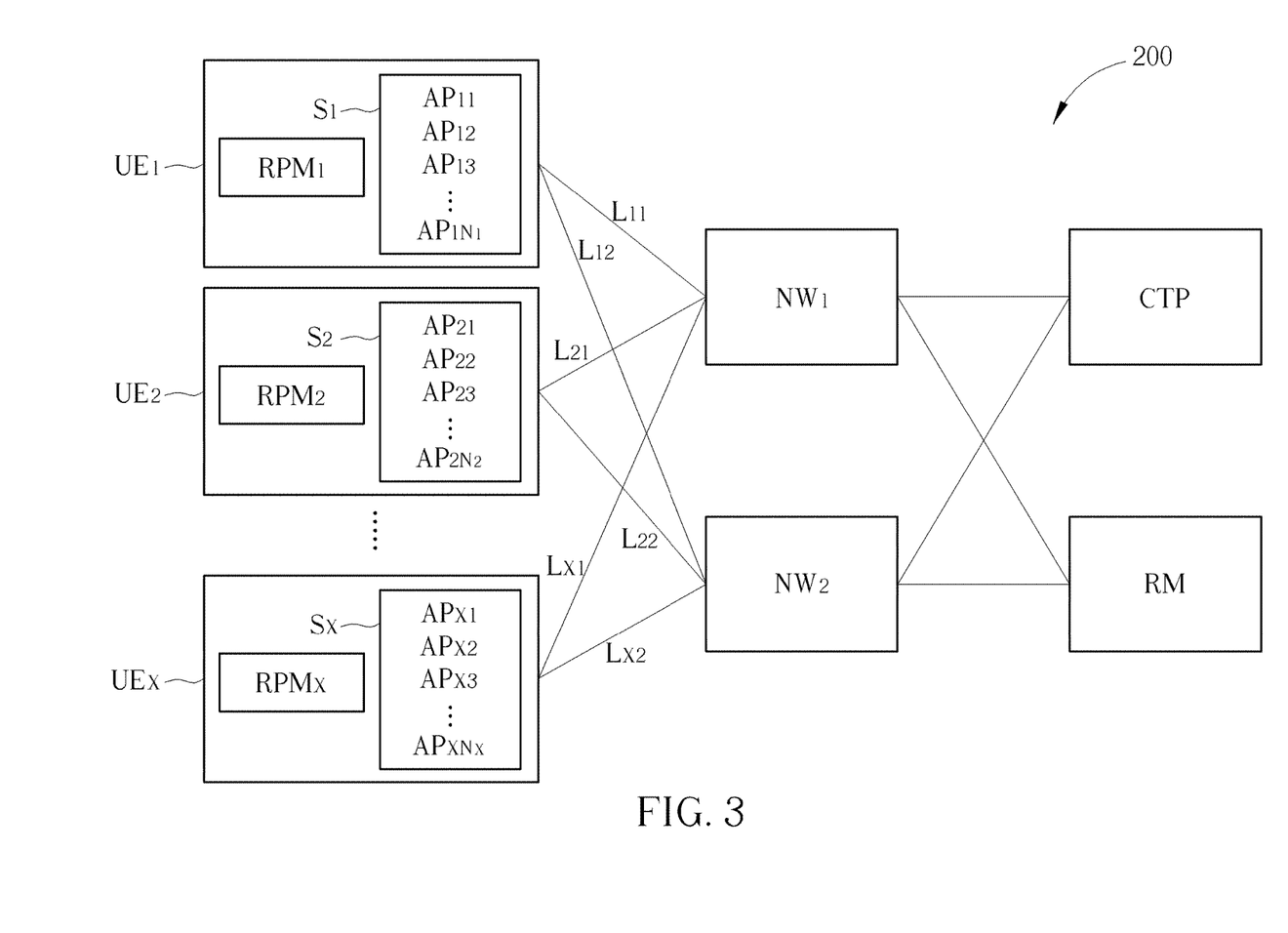
FIG. 3 illustrates a block diagram of a data transmission system according to another embodiment of the present invention.

The following is a description of a method of allocating bandwidths for a plurality of mobile devices. FIG. 3 illustrates a block diagram of a data transmission system 200 according to another embodiment of the present invention. The data transmission system 200 may consider the status of X mobile devices and two heterogeneous networks. In FIG. 3, the data transmission system 200 includes a first mobile device $UE_1$ to $X^{th}$ mobile device $UE_X$, a first network $NW_1$, a second network $NW_2$, a content provider CTP, and a resource management device RM. Aside from the $X^{th}$ mobile device $UE_X$, the remaining (X-1) mobile devices $UE_1$ to $UE_{X-1}$ may be within the network coverage of the first network $NW_1$ and the second network $NW_2$. The $X^{th}$ mobile device $UE_X$ may be an external mobile device and may link to the first network $NW_1$ and the second network $NW_2$. For presentation simplicity, in the following disclosure, the first to $(X-1)^{th}$ mobile devices $UE_1$ to $UE_{X-1}$ may be referred to as mobile devices $UE_1$ to $UE_{X-1}$ and the $X^{th}$ mobile device $UE_X$ may be referred to as mobile device $UE_X$. The mobile device $UE_1$ may link to the first network $NW_1$ through a path $L_{21}$ and link to the second network $NW_2$ through a path $L_{22}$. The mobile device $UE_2$ may link to the first network $NW_1$ through a path $L_{21}$ and link to the second network $NW_2$ through a path $L_{22}$. Similarly, the mobile device $UE_{X-1}$ may link to the first network $NW_1$ and link to the second network $NW_2$ through different respective paths. The external mobile device $UE_X$ may link to the first network $NW_1$ through a path $L_{X1}$ and link to the second network $NW_2$ through a path $L_{X2}$. In the embodiment, the mobile devices $UE_1$ to $UE_X$ may each have a respective internal routing policy manager $RPM_1$ to $RPM_X$ and a respective list $S_1$ to $S_X$ listing application programs currently running. The list $S_1$ may list application programs $AP_{11}$ to $AP_{1N1}$ currently running in the mobile device $UE_1$. The list $S_2$ may list application programs $AP_{21}$ to $AP_{2N2}$ currently running in the mobile device $UE_2$. In the same way, the list $S_X$ may list application programs $AP_{X1}$ to $AP_{XNX}$ currently running in the mobile device $UE_X$. The respective internal routing policy managers $RPM_1$ to $RPM_X$ of the mobile devices $UE_1$ to $UE_X$ function in the same way as in the embodiment shown in FIG. 2, thus, it will no longer be described for brevity. The resource management device RM and the content provider CTP are linked to the first network $NW_1$ and the second network $NW_2$. Each of the first network $NW_1$ and the second network $NW_2$ is a heterogeneous network. However, the embodiment presented having the first network $NW_1$ and the second network $NW_2$ is only an exemplary embodiment and is not meant to limit the scope of the invention. The resource management device RM and the content provider CTP may link to more than two heterogeneous networks instead. Furthermore, the resource management device RM and/or the content provider CTP may be built within the circuit of a mobile device. Each of the application programs currently running in a respective mobile device $UE_1$ to $UE_X$ uses a corresponding bandwidth. The routing policy manager of a mobile device may acquire the bandwidth requirement of the application programs currently running in the mobile device. For example, the routing policy manager $RPM_1$ of the mobile device $UE_1$ may acquire the sum C(1) of the minimum bandwidth requirements and the sum. V(1) of the maximum bandwidth requirements of the application programs $AP_{11}$ to $AP_{1N1}$ currently running. Similar to FIG. 1, the sum C(1) is the summation of the minimum bandwidth requirements $C_{11}$ to $C_{1N1}$ of the application programs $AP_{11}$ to $AP_{1N1}$ currently running, as $$C(1) = \sum_{n=1}^{N_1} C_{1n}.$$

The sum V(1) is the summation the maximum bandwidth requirements $V_{11}$ to $V_{1N1}$ of the application programs $AP_{11}$ to $AP_{1N1}$ currently running, as $$V(1) = \sum_{n=1}^{N_1} V_{1n}.$$

In the same way, the routing policy manager $RPM_2$ of the mobile device $UE_2$ may acquire the sum $C(2)$ of the minimum bandwidth requirements and the sum $V(2)$ of the maximum bandwidth requirements of the application programs $AP_{21}$ to $AP_{2N2}$ currently running. The sum $C(2)$ is the summation of the minimum bandwidth requirements $C_{21}$ to $C_{2N2}$ of the application programs $AP_{21}$ to $AP_{2N2}$ currently running, as $$C(2) = \sum_{n=1}^{N_2} C_{2n}.$$

The sum $V(2)$ is the summation of the maximum bandwidth requirements $V_{21}$ to $V_{2N2}$ of the application programs $AP_{21}$ to $AP_{2N2}$ currently running, as $$V(2) = \sum_{n=1}^{N_2} V_{2n}.$$

The routing policy manager $RPM_X$ of the external mobile device $UE_X$ may acquire the sum $C(X)$ of the minimum bandwidth requirements and the sum $V(X)$ of the maximum bandwidth requirements of the application programs $AP_{X1}$ to $AP_{XNX}$ currently running. The sum $C(X)$ is the summation of the minimum bandwidth requirements $C_{X1}$ to $C_{XNX}$ of the application programs $AP_{X1}$ to $AP_{XNX}$ currently running, as $$C(X) = \sum_{n=1}^{N_X} C_{Xn}.$$

The sum $V(X)$ is the summation of the maximum bandwidth requirements $V_{X1}$ to $V_{XNX}$ of the application programs $AP_{X1}$ to $AP_{XNX}$ currently running, as $$V(X) = \sum_{n=1}^{N_X} V_{Xn}.$$

In the embodiment, the sums of bandwidth requirements acquired by each of the mobile devices may be announced (i.e. an application program may be used to share a bandwidth requirement result to other mobile devices). Therefore, when the external mobile device $UE_X$ establishes a data link to the first network $NW_1$ and the second network $NW_2$ (that is sending a request for data link), all of the mobile devices $UE_1$ to $UE_X$ may start coordinating such that the bandwidth allocation for the mobile devices $UE_1$ to $UE_{X-1}$ and the external mobile device $UE_X$ within the network coverage may be optimized. The following paragraph includes a description of the method for allocating bandwidths of the mobile devices $UE_1$ to $UE_{X-1}$ and the method for allocating bandwidth of the external mobile device $UE_X$.

An example is used to describe the bandwidth allocation process for the data transmission system 200 and, more particularly, describe a method of allocating bandwidths of the mobile devices $UE_1$ to $UE_X$ of the data transmission system 200 under different condition. The following several bandwidth conditions may be considered:

(A) When the external mobile device $UE_X$ establishes a data link with the first network $NW_1$ and the second network $NW_2$ and the bandwidth requirements for the mobile devices $UE_1$ to $UE_X$ measured by the data transmission system 200 satisfy the condition $$\sum_{i=1}^{X} C(i) > NWB_1$$

wherein $NWB_1$ denotes the maximum bandwidth of the first network $NW_1$, all of the mobile devices $UE_1$ to $UE_X$ may use the linking speed for the minimum bandwidth requirement. In this case, the first network $NW_1$ may not be able to support the additional linking of the external mobile device $UE_X$ (i.e. first network $NW_1$ may overload). Therefore, the data transmission system 200 may forbid the external mobile device $UE_X$ from using the first network $NW_1$ to transmit data. Similarly, when the mobile devices $UE_1$ to $UE_X$ of data transmission system 200 satisfy the condition $$\sum_{i=1}^{X} C(i) > NWB_2$$

wherein $NWB_2$ denotes the maximum bandwidth of the second network $NW_2$, the data transmission system 200 may forbid the external mobile device $UE_X$ from using the second network $NW_2$ to transmit data.

(B) When the external mobile device $UE_X$ establishes a data link with the first network $NW_1$ and the second network $NW_2$ and the bandwidth requirements for the mobile devices $UE_1$ to $UE_X$ measured by data transmission system 200 satisfy the condition $$\sum_{i=1}^{X} C(i) \le NWB_1$$

and $$\sum_{i=1}^{X} V(i) > NWB_1$$

wherein $NWB_1$ denotes the maximum bandwidth of the first network $NW_1$. In this case, the first network $NW_1$ may be able to deal with bandwidths of all of the application programs currently running in the mobile devices $UE_1$ to $UE_X$ by using minimum bandwidth requirements. Specifically, the first network $NW_1$ may not be able to load the addition bandwidth of the external mobile device $UE_X$ operating using maximum bandwidth when the bandwidths of all of the application programs currently running in the mobile devices $UE_1$ to $UE_{X-1}$ within the network coverage are using maximum bandwidth requirements. Therefore, the data transmission system 200 may limit the bandwidth used by the external mobile device $UE_X$ in the first network $NW_1$. Similarly, when the mobile devices $UE_1$ to $UE_X$ of data transmission system 200 satisfy the condition $$\sum_{i=1}^{X} C(i) \le NWB_2 \text{ and } \sum_{i=1}^{X} V(i) > NWB_2$$

wherein $NWB_2$ denotes the maximum bandwidth of the second network $NW_2$, the data transmission system 200 may limit the bandwidth used by the external mobile device $UE_X$ in the second network $NW_2$.

(C) When the external mobile device $UE_X$ establishes a data link with the first network $NW_1$ and the second network $NW_2$ and the bandwidth requirements for the mobile devices $UE_1$ to $UE_X$ measured by data transmission system 200 satisfy the condition $$\sum_{i=1}^{X} V(i) \le NWB_1$$

wherein $NWB_1$ denotes the maximum bandwidth of the first network $NW_1$, the $$\sum_{i=1}^{X} V(i)$$

may be greater than $$\sum_{i=1}^{X} C(i).$$

Therefore, the condition $$\sum_{i=1}^{X} V(i) \le NWB_1$$

meets the condition $$\sum_{i=1}^{X} C(i) \le NWB_1.$$

In this case, the first network $NW_1$ may not only be able to load all bandwidths with respect to all of the application programs currently running in the mobile devices $UE_1$ to $UE_X$ using minimum bandwidth requirements, but also all of the application programs currently running in the mobile devices $UE_1$ to $UE_X$ using maximum bandwidth requirements. Therefore, the data transmission system 200 may allow the external mobile device $UE_X$ to use the first network $NW_1$ for data transmission. Also, each of the mobile devices $UE_1$ to $UE_{X-1}$ and the external mobile device $UE_X$ may use respective optimal bandwidth allocation result to establish links. Similarly, when the mobile devices $UE_1$ to $UE_X$ of data transmission system 200 satisfy the condition $$\sum_{i=1}^{X} V(i) \le NWB_2$$

wherein $NWB_2$ denotes the maximum bandwidth of the second network $NW_2$, the data transmission system 200 may allow the external mobile device $UE_X$ to use the second network $NW_2$ for data transmission.

(D) When the external mobile device $UE_X$ establishes a data link with the first network $NW_1$ and the second network $NW_2$ and the bandwidth requirements for the mobile devices $UE_1$ to $UE_X$ measured by data transmission system 200 satisfy the condition $$\sum_{i=1}^{X} C(i) > NWB_1$$

wherein $NWB_1$ denotes the maximum bandwidth of the first network $NW_1$, even though all of the mobile devices $UE_1$ to $UE_X$ may use the speed for minimum bandwidth requirement for linking, the first network $NW_1$ may not load the additional bandwidth of the external mobile device $UE_X$ (i.e. first network $NW_1$ may overload). The transmission system 200 may adjust the sum of the minimum bandwidth requirements of the application programs of at least one of the mobile devices $UE_1$ to $UE_{X-1}$ within the network coverage. In other words, the bandwidth requirement $$\sum_{i=1}^{X-1} C(i)$$

may be reduced to allow the external mobile device $UE_X$ to use the first network $NW_1$ to transmit data. Similarly, when the bandwidth requirements for the mobile devices $UE_1$ to $UE_X$ measured by data transmission system 200 satisfy the condition $$\sum_{i=1}^{X} C(i) > NWB_2$$

wherein $NWB_2$ denotes the maximum bandwidth of the second network $NW_2$, the transmission system 200 may adjust the sum of the minimum bandwidth requirements of the application programs of at least one of the mobile devices $UE_1$ to $UE_{X-1}$ within the network coverage. As a result, the bandwidth requirement $$\sum_{i=1}^{X-1} C(i)$$

may be reduced to allow the external mobile device $UE_X$ to use the second network $NW_2$ for data transmission (i.e. the sum of the adjusted $$\sum_{i=1}^{X-1} C(i)$$

and C(x) may be smaller than the maximum bandwidth $NWB_2$ of the second network $NW_2$).

The previous and current status of the adjustments to sum of the minimum bandwidth requirements of the mobile devices $UE_1$ to $UE_{X-1}$ within the network coverage may be recorded within the respective mobile device or be recorded in the resource management device RM. The recorded adjustments of bandwidths may include reduced (released) bandwidth scaling, bandwidth requirement scaling, etc. of the mobile devices $UE_1$ to $UE_{X-1}$. Therefore, when the external mobile device $UE_X$ needs to establish a data link with the first network $NW_1$ and the second network $NW_2$, the mobile devices $UE_1$ to $UE_{X-1}$ within the network coverage or the resource management device RM may adjust the respective sum of minimum bandwidth requirements according to the adjustments to sum of the minimum bandwidth requirements recorded within the mobile devices $UE_1$ to $UE_{X-1}$ or the resource management device RM such that the external mobile device $UE_X$ may be able to perform data transmission using the sum C(X) of the minimum bandwidth requirements. To promote reducing (releasing) of bandwidth by the mobile devices $UE_1$ to $UE_{X-1}$, behaviors for releasing bandwidths such as the scaling, bandwidth adjustment, etc. may be converted to a value of contribution of the system. When the mobile devices $UE_1$ to $UE_{X-1}$ re-establish a data link with the first network $NW_1$ and the second network $NW_2$ after disconnecting, the data transmission system 200 may perform compensation according to the value of contribution of the system of the mobile devices such that the mobile devices may be allocated with the optimal or minimum bandwidth priority.

In another method, when the bandwidth usage for the first network $NW_1$ and the second network $NW_2$ is greater than a predetermined value, the data transmission system 200 may force the mobile devices $UE_1$ to $UE_{X-1}$ to terminate the application programs using maximum bandwidth requirement, such as video streaming programs, and allow the first network $NW_1$ and the second network $NW_2$ to accommodate more users.

However, the abovementioned bandwidth adjustment method may be performed even when the external mobile device $UE_X$ has not been detected to want to link to the first network $NW_1$. That is, the mobile devices $UE_1$ to $UE_{X-1}$ within the network coverage may directly adjust the bandwidths being used. For example, the mobile devices $UE_1$ to $UE_{X-1}$ may link to the first network $NW_1$. Each of the mobile devices $UE_1$ to $UE_{X-1}$ may have at least one application program running. Therefore, each of the mobile devices $UE_1$ to $UE_{X-1}$ may use a bandwidth corresponding to a mobile device. When the data transmission system 200 acquires the sum of the bandwidths for each of the mobile devices and determines that a sum of the bandwidths of each of the mobile devices exceeds a predetermined value, the first network $NW_1$ may broadcast a bandwidth limitation message to the mobile devices $UE_1$ to $UE_{X-1}$. After receiving the bandwidth limitation message, all or apart of the mobile devices $UE_1$ to $UE_{X-1}$ may use a bandwidth smaller than a predetermined limit so that each of the mobile devices $UE_1$ to $UE_{X-1}$ may have a sum of bandwidths smaller than or equal to the predetermined value.

According to abovementioned embodiments for determining different bandwidth conditions and determination of said condition, the data transmission system 200 may be able to use a different bandwidth allocation strategy for the mobile devices $UE_1$ to $UE_X$. The present invention is not limited to the above described embodiment. In other embodiments, aside from using a different method of determining condition, the condition $$\sum_{i=1}^{X} C(i) > NWB_1 \text{ or } \sum_{i=1}^{X} V(i) > NWB_1$$

may be changed to respectively $$\sum_{i=1}^{X} C(i) > Th_1 \text{ or } \sum_{i=1}^{X} V(i) > Th_2,$$

wherein $Th_1$ and $Th_2$ are two predetermined values. The predetermined values $Th_1$ and $Th_2$ may or may not be identical. The use of the predetermined values $Th_1$ and $Th_2$ increases the flexibility of the data transmission system 200 to perform bandwidth allocation. Furthermore, as shown in FIG. 3, the mobile devices $UE_1$ to $UE_{X-1}$ within the network coverage may use the resource management device RM of the first network $NW_1$ and the second network $NW_2$ to send bandwidth feedbacks. The mobile devices $UE_1$ to $UE_{X-1}$ may send bandwidth feedbacks to the resource management device RM to register the bandwidth allocation. When the external mobile device $UE_X$ links to the first network $NW_1$ and the second network $NW_2$, the external mobile device $UE_X$ may send a bandwidth message and register a bandwidth allocation to the resource management device RM. The resource management device RM may then send a report including the bandwidth utilization status and the bandwidth allocation status of the external mobile device $UE_X$ to the mobile devices within the network coverage. And, the adjustment of the bandwidths for the mobile devices $UE_1$ to $UE_X$ is managed according to the above described conditions.

The present invention discloses a data transmission system that uses a plurality of heterogeneous networks for allocating the bandwidths used by application programs currently running. The resources (bandwidths) of the plurality of heterogeneous networks are used simultaneously. Therefore, as compared to the prior art that only uses a single network, the data transmission system of the present invention may not only increase the data transmission rate, but also optimize the bandwidth utilization efficiency of application programs currently running. In doing so, the user may be provided with a better linking quality when using a foreground application program.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data transmission method comprising:
 linking a first mobile device to a first wireless network with a first linking quality;

linking the first mobile device to a second wireless network with a second linking quality;

acquiring a sum of first bandwidth requirements of application programs currently running in the first mobile device;

acquiring a sum of second bandwidth requirements of application programs currently running in the first mobile device;

acquiring a bandwidth allocation result according to the first linking quality, the second linking quality, the sum of first bandwidth requirements, and the sum of second bandwidth requirements by the first mobile device;

establishing a data link to the first wireless network and/or the second wireless network from the first mobile device according to the bandwidth allocation result; and performing data transmission between the application programs and the first wireless network and/or the second wireless network;

wherein the sum of second bandwidth requirements is greater than the sum of first bandwidth requirements, the bandwidth allocation result corresponds to a value of bandwidth utilization, and the value of bandwidth utilization is between the sum of first bandwidth requirements and the sum of second bandwidth requirements.

2. The data transmission method of claim 1, further comprising:

disabling a running application program and enabling a new application program selectively;

updating the sum of first bandwidth requirements and the sum of second bandwidth requirements;

acquiring an updated bandwidth allocation result according to the first linking quality, the second linking quality, an updated sum of first bandwidth requirements, an updated sum of second bandwidth requirements; and reallocating the updated sum of first bandwidth requirements and the updated sum of second bandwidth requirements to the first wireless network and/or the second wireless network according to the updated bandwidth allocation result.

3. The data transmission method of claim 1, wherein acquiring the sum of first bandwidth requirements of the first mobile device is acquiring the sum of first bandwidth requirements according to a utilization priority of the application programs currently running in the first mobile device.

4. The data transmission method of claim 1, wherein establishing the data link to the first wireless network and/or the second wireless network from the first mobile device according to the bandwidth allocation result comprises:

when the first linking quality is better than the second linking quality, and a sum of maximum bandwidths of the first wireless network and the second wireless network is smaller than the sum of second bandwidth requirements, the first mobile device selecting the first wireless network for establishing the data link and performs data transmission of the application programs by using the sum of first bandwidth requirements.

5. The data transmission method of claim 1, wherein the sum of first bandwidth requirements is a sum of minimum bandwidth requirements of the application programs currently running, and the sum of second bandwidth requirements is a sum of maximum bandwidth requirements of the application programs currently running.

6. The data transmission method of claim 1, wherein the application programs currently running comprise a foreground application program and a background application program, and establishing the data link to the first wireless network and/or the second wireless network from the first mobile device according to the bandwidth allocation result comprises:

the first mobile device selecting a network with a better linking quality from the first wireless network and the second wireless network according to the first linking quality and the second linking quality; and allocating a bandwidth of a selected network to the foreground application program;

wherein the background application program is selectively allocated with a bandwidth of the first wireless network or a bandwidth of the second wireless network.

7. The data transmission method of claim 6, wherein the first bandwidth requirements comprises a utilization bandwidth of the foreground application program and a minimum background bandwidth requirement of the background application program, and the second bandwidth requirements comprises a maximum foreground bandwidth requirement of the foreground application program and a maximum background bandwidth requirement of the background application program.

8. The data transmission method of claim 7, wherein when the foreground application program establishes a data link by using the utilization bandwidth equal to a minimum foreground bandwidth requirement, the foreground application program performs media data transmission with a first resolution, when the foreground application program establishes the data link by using the utilization bandwidth equal to the maximum foreground bandwidth requirement, the foreground application program performs media data transmission with a second resolution, and the second resolution is higher than the first resolution.

9. The data transmission method of claim 1, further comprising:

linking a plurality of mobile devices to the first wireless network, wherein the plurality of mobile devices include the first mobile device, each mobile device of the plurality of mobile devices having a sum of first minimum bandwidth requirements and a sum of first maximum bandwidth requirements;

linking a second mobile device to the first wireless network for running a first application program;

acquiring a sum of second minimum bandwidth requirements and a sum of second maximum bandwidth requirements of the second mobile device; and when a sum of the sum of second minimum bandwidth requirements and a sum of first minimum bandwidth requirements of the plurality of mobile devices is greater than a first predetermined value, decreasing a sum of first minimum bandwidth requirements of at least one mobile device selected from the plurality of mobile devices.

10. The data transmission method of claim 1, further comprising:

linking a plurality of mobile devices to the first wireless network, wherein the plurality of mobile devices comprise the first mobile device, each mobile device of the plurality of mobile devices having a sum of first minimum bandwidth requirements and a sum of first maximum bandwidth requirements;

linking a second mobile device to the first wireless network for running a first application program;

acquiring a sum of second minimum bandwidth requirements and a sum of second maximum bandwidth requirements of the second mobile device; and when a sum of the sum of second minimum bandwidth requirements and a sum of first minimum bandwidth requirements of the plurality of mobile devices is greater than a first predetermined value, disabling data transmission of the first application program in the second mobile device through the first wireless network.

11. The data transmission method of claim 10, further comprising:

linking the plurality of mobile devices to the second wireless network;

linking the second mobile device to the second wireless network; and when a sum of the sum of second maximum bandwidth requirements and a sum of first maximum bandwidth requirements of the plurality of mobile devices is greater than a second predetermined value, limiting a utilization bandwidth of the second mobile device.

12. A data transmission method comprising:

linking a plurality of mobile devices to a first wireless network;

acquiring a sum of minimum bandwidth requirements of application programs currently running in each mobile device;

acquiring a sum of maximum bandwidth requirements of application programs currently running in each mobile device;

linking an external mobile device to the first wireless network;

acquiring a sum of external minimum bandwidth requirements of application programs currently running in the external mobile device;

acquiring a sum of external maximum bandwidth requirements of application programs currently running in the external mobile device; and adjusting a utilization bandwidth of the external mobile device according to a sum of minimum bandwidth requirements of the plurality of mobile devices, a sum of maximum bandwidth requirements of the plurality of mobile devices, the sum of external minimum bandwidth requirements of the external mobile device, and/or the sum of external maximum bandwidth requirements of the external mobile device;

wherein the plurality of mobile devices are exclusive of the external mobile device, the external mobile device is disconnected before the external mobile device is linked to the first wireless network.

13. The data transmission method of claim 12, further comprising:

generating and registering a bandwidth allocation result by using a resource management device according to the sum of minimum bandwidth requirements and the sum of maximum bandwidth requirements of each mobile device; and registering the sum of external minimum bandwidth requirements of the external mobile device and the sum of external maximum bandwidth requirements of the external mobile device to the resource management device;

wherein adjusting the utilization bandwidth of the external mobile device is adjusting the utilization bandwidth of the external mobile device by using the resource management device.

14. The data transmission method of claim 12, wherein adjusting the utilization bandwidth of the external mobile device according to the sum of minimum bandwidth requirements of the plurality of mobile devices, the sum of maximum bandwidth requirements of the plurality of mobile devices, the sum of external minimum bandwidth requirements of the external mobile device, and/or the sum of external maximum bandwidth requirements of the external mobile device comprises:

when a sum of the sum of external minimum bandwidth requirements of the external mobile device and a sum of minimum bandwidth requirements of the plurality of mobile devices is greater than a predetermined value, decreasing a sum of bandwidth requirements of at least one mobile device selected from the plurality of mobile devices.

15. The data transmission method of claim 14, wherein a decreasing amount of the sum of bandwidth requirements of at least one mobile device selected from the plurality of mobile devices corresponds to a value of linking contribution, and the value of linking contribution contributes to an increase of a priority value of bandwidth utilization when the at least one mobile device accesses the first wireless network again.

16. The data transmission method of claim 12, wherein adjusting the utilization bandwidth of the external mobile device according to the sum of minimum bandwidth requirements of the plurality of mobile devices, the sum of maximum bandwidth requirements of the plurality of mobile devices, the sum of external minimum bandwidth requirements of the external mobile device, and/or the sum of external maximum bandwidth requirements of the external mobile device comprises:

when a sum of the sum of external minimum bandwidth requirements of the external mobile device and a sum of minimum bandwidth requirements of the plurality of mobile devices is greater than a predetermined value, disabling data transmissions of all application programs in the external mobile device through the first wireless network.

17. The data transmission method of claim 12, further comprising:

linking the plurality of mobile devices to a second wireless network;

linking the external mobile device to the second wireless network; and when a sum of the sum of external maximum bandwidth requirements of the external mobile and a sum of maximum bandwidth requirements of the plurality of mobile devices is greater than a predetermined value, limiting a utilization bandwidth of the external mobile device, wherein the application programs currently running in each mobile device comprises a foreground application program and a background application program, each mobile device selects a network with a better linking quality from the first wireless network and the second wireless network, each mobile device allocates a bandwidth of a selected network to the foreground application program, and the background application program is selectively allocated with a bandwidth of the first wireless network or a bandwidth of the second wireless network.

18. A data transmission method comprising:

linking a plurality of mobile devices to a first wireless network, each mobile device of the plurality of mobile devices having a bandwidth utilized by at least one application program; and acquiring a sum of bandwidths utilized by the plurality of mobile devices;

wherein when the sum of bandwidths utilized by the plurality of mobile devices is greater than a predetermined value, a limitation message is broadcasted to the plurality of mobile devices through the first wireless network for limiting bandwidths utilized by a portion of the plurality of mobile devices, and the bandwidths utilized by the portion of the plurality of mobile devices are decreased to be lower than an upper bound.

* * * * *